United States Patent [19]

Hembree et al.

[11] Patent Number: 5,527,451
[45] Date of Patent: Jun. 18, 1996

[54] WATER TREATMENT DEVICE WITH VOLUME TOTALIZATION VALVE

[75] Inventors: Richard D. Hembree, Edina; Brian F. Sullivan, Minneapolis, both of Minn.

[73] Assignee: Recovery Engineering, Inc., Minneapolis, Minn.

[21] Appl. No.: 207,380

[22] Filed: Mar. 8, 1994

[51] Int. Cl.[6] ................................................. B01D 35/143
[52] U.S. Cl. ........................... 210/88; 210/91; 210/100; 210/424; 210/433.1; 210/434; 210/449; 210/460; 73/861.79; 73/861.87; 73/861.88; 222/14; 222/16; 222/20
[58] Field of Search ........................ 210/91, 100, 433.1, 210/434, 424, 87, 449, 460, 88; 73/861.87, 861.88, 861.79; 222/14, 16, 20

[56] References Cited

U.S. PATENT DOCUMENTS

| | | |
|---|---|---|
| 4,172,796 | 10/1979 | Corder . |
| 4,379,053 | 4/1983 | Brane ...................................... 210/424 |
| 4,489,616 | 12/1984 | Priddy ..................................... 210/87 |
| 4,681,677 | 7/1987 | Kuh et al. ............................... 210/100 |
| 4,686,037 | 8/1987 | Lang . |
| 4,698,164 | 10/1987 | Ellis . |
| 4,769,135 | 9/1988 | Norton . |
| 4,770,768 | 9/1988 | Lang . |
| 4,772,386 | 9/1988 | Grout et al. . |
| 4,885,081 | 12/1989 | Oliver ..................................... 210/87 |
| 4,918,426 | 4/1990 | Butts et al. . |
| 5,050,772 | 9/1991 | Brane et al. ........................... 210/100 |
| 5,065,901 | 11/1991 | Brane et al. ........................... 210/100 |
| 5,089,144 | 2/1992 | Ozkahyaoglu et al. ............... 210/767 |
| 5,099,870 | 3/1992 | Moore et al. . |
| 5,192,436 | 3/1993 | Sasaki et al. ........................... 210/424 |
| 5,254,242 | 10/1993 | van der Meer et al. . |

FOREIGN PATENT DOCUMENTS

| | | |
|---|---|---|
| 0537528A1 | 4/1993 | European Pat. Off. . |
| 4094708 | 3/1992 | Japan . |
| 2093005 | 8/1982 | United Kingdom . |

Primary Examiner—Robert A. Dawson
Assistant Examiner—Kenneth M. Jones
Attorney, Agent, or Firm—Merchant, Gould, Smith, Edell, Welter & Schmidt

[57] ABSTRACT

A water treatment device including an arrangement having mechanisms for mechanically totaling the volume of water filtered and for indicating when the replaceable filter cartridge has reached the end of its useful life. End-of-life indication is provided by a valve mechanism for stopping flow after a predetermined volume has been filtered. The arrangement includes a novel mechanism for resetting the flow totalization mechanism. The preferred water treatment device is faucet mounted and also includes a novel flow bypass design.

34 Claims, 4 Drawing Sheets

WATER TREATMENT DEVICE WITH VOLUME TOTALIZATION VALVE

FIELD OF THE INVENTION

This invention relates generally to water treatment devices, and more particularly to devices incorporating mechanisms for end-of-life indication, automatic shutoff, resetting the automatic shutoff and bypass.

BACKGROUND OF THE INVENTION

Water treatment devices for home and other use are well known in the art. Such devices are incorporated into a water system either in-line or at a terminal end. An example of the former would be an under-the-counter device which filters water prior to reaching the faucet. There are two common types of terminal end devices—countertop and faucet-mounted. As compared to countertop and under-the-sink devices, designing a faucet-mounted device presents special challenges. These include making the device sufficiently light so that it can be attached to a faucet and sufficiently compact so that the device does not take up valuable sink space.

Water treatment devices can treat water by the use of mechanical filtration or chemical treatment. Mechanical filters treat water by preventing passage of particulates. As a mechanical filter approaches the end of its useful life, reduced or stopped flow due to particulate accumulation provides a ready indication that element replacement is necessary. By contrast, when the capacity of a chemical element is exceeded, there is no such indication. Chemical treatment is accomplished by processes such as adsorption (e.g. charcoal media) and ion exchange (e.g. for lead removal). Such chemical treatment eventually degrades and becomes inactive. However, no indication is provided to the user that the water is no longer being treated by the media.

As a result, various approaches have been taken to indicate end of life to the user where it is not inherently provided by the behavior of the filter media. One example is shown in U.S. Pat. No. 4,686,037. In this approach, a pre-filter is used to entrap contaminants, and the color of the pre-filter is compared by the user with a reference strip to determine when the media requires replacement. The problem with this approach, however, is that it is inherently subjective, and therefore subject to error. Also, the user can easily forget to check the reference filter and mistakenly believe the media is still purifying when it is not.

A much more accurate and foolproof means of indicating end of life is through totalizing the volume which has passed through the media and automatically shutting off flow after a predetermined volume has passed through the device. Although the flow totalization and shutoff valve mechanisms required are relatively expensive and complex, this has become recognized as the most accurate means of indicating end of life. For example, the certifying agency in the United States for water treatment devices, the National Sanitation Foundation, requires for certification of a rated volume, twice the filter media capacity when an automatic shutoff is not used, and only 20% additional capacity when an automatic shutoff is employed.

Both electrical and mechanical approaches to flow totalization are known in the prior art. Examples of the former are shown in U.S. Pat. Nos. 4,918,426 and 5,089,144. In this approach, flow rate is measured by, for example, a pressure transducer and then integrated to calculate total volume. After a predetermined volume has been reached, a valve is electrically actuated to stop flow.

Examples of mechanical totalization in water treatment devices are shown in U.S. Pat. Nos. 4,681,677 and 4,698,164. In the mechanical approach, typically a turbine powered by water flowing through the device is interconnected with a series of gears which mechanically "add up" the volume of water which has passed through the device. In turn, the gearing mechanism is interconnected with a valve such that, after a predetermined volume of water has passed through the device, the valve is mechanically actuated to stop flow through the device.

However, prior art mechanical automatic shutoff mechanisms suffer from certain shortcomings. One problem is that the mechanisms employed, such as in the '677 patent, are too bulky to be included in a compact device. Another problem with prior art devices is that they make resetting the totalization and shutoff mechanism unnecessarily difficult and/or expensive. For example, to reset the device shown in the '677 patent, one would apparently have to manually release the valve from the rotating cam and manually disengage the gearing mechanism to reset the totalization mechanism to a zero volume position. In the '164 patent, the valve shutoff mechanism is incorporated into the replaceable cartridge, and the shutoff valve is connected to the gearing mechanism upon replacement of the cartridge. This approach is unnecessarily wasteful and expensive because the shutoff valve is thrown away with each cartridge, rather than being reused.

With respect to faucet-mounted water treatment devices, it is not known in the prior art to incorporate automatic shutoff end-of-life indication. This is due at least in part to the obstacles associated with incorporating a mechanical flow totalization and-shutoff mechanism in the required compact size. As a result, prior art devices have employed much cruder forms of end-of-life indication, such as that discussed above in the '037 patent. Not only are prior art end-of-life indicating devices much less accurate, but they are also unnecessarily wasteful due to the more frequent cartridge replacement often required by certification standards.

A feature that is common to faucet-mounted devices is the ability to bypass or divert water from the filter media so that untreated water can be obtained from the faucet. This is desirable because it avoids unnecessary use of the filter media, allowing the user to bypass the water treatment device if the water is not intended for drinking, as for example for washing hands or dishes.

Such a bypass mechanism is shown in the '037 patent. In this approach, a separate handle is attached to the opposite end of the mounting member to control a bypass valve. Other prior art devices use this same approach, and therefore suffer from certain disadvantages. The separate handle adds unnecessary complexity and expense to manufacturing a bypass mechanism. Also, because of the environment in which faucet-mounted devices are employed, there is a significant problem with keeping such devices clean. A separate handle only makes this more difficult, adding increased surface area and creating difficult-to-clean crevices. Finally, the added handle makes the appearance of the device less appealing, which is a particularly important concern for faucet-mounted devices.

What has been needed is a compact, low-cost and easy-to-manufacture water treatment device having an automatic shutoff mechanism which is easy to reset. What has also been needed is a faucet-mounted device incorporating automatic shutoff and a simple bypass mechanism.

SUMMARY OF THE INVENTION

According to the present invention, a water treatment device having a replaceable filter cartridge is provided. The filter cartridge can include mechanical or chemical filter media or a combination thereof.

In one aspect of the invention, the water treatment device includes an arrangement comprising a mechanism for mechanically totalling the volume of water that has been filtered and a mechanism for indicating when the replaceable filter cartridge has reached the end of its useful life. End of life indication is provided by a valve mechanism for stopping flow after a predetermined volume has been filtered. The arrangement also comprises a mechanism for resetting the flow totalization mechanism, including a spring. The spring is connected with and biased by the flow totalization mechanism, and a mechanism for releasing the spring to reset the flow totalization mechanism is included. The spring can be any of a variety of mechanical springs which would be suitable for this purpose, including for example torsional, coil, leaf, and helical springs in either compression or tension.

In another aspect of the invention, the water treatment device includes an arrangement comprising a shutoff valve which closes to stop flow after a predetermined volume of water has passed through the cartridge. The arrangement further includes a spring which is loaded when the shutoff valve closes and a release arm which causes the spring to unload and force the shutoff valve open during replacement of the filter cartridge.

In another aspect of the invention, the water treatment device includes an arrangement comprising a mechanism for mechanically totalling the volume of water that has been filtered and a mechanism for indicating end of life by stopping flow after a predetermined volume has been filtered. A shutoff valve mechanism is permanently contained within the device such that it is not replaced upon replacement of the filter cartridge. The arrangement also comprises a mechanism for resetting the flow totalization mechanism, which includes a mechanism for resetting by replacement of the filter cartridge.

The reset mechanisms of the present invention can be employed not only in terminal-end water treatment devices, such as faucet-mounted and counter-top, but also in in-line devices, such as under-the-counter.

In another aspect of the invention, the water treatment device comprises a faucet-mounted device. The faucet-mounted device comprises a mechanism for indicating end of life by stopping flow of water through the filter cartridge after a predetermined volume of water has been filtered through the device.

In yet another aspect of the invention, the water treatment device comprises a faucet-mounted device with a novel flow-bypass design. The faucet-mounted device comprises a housing with a filter element contained therein and having inlet and outlet openings. A mounting member includes inlet and outlet ports, with the inlet port being attachable to the faucet. A valve is in operable connection with the mounting member and the housing and includes first and second flow channels. The first flow channel extends between the inlet port and the inlet opening, and the second flow channel extends between the inlet and outlet ports. The valve body is rotatable with respect to the mounting member between first and second flow positions. In the first flow position, water flows from the inlet port, through the first flow channel, into the inlet opening of the housing, through the filter element and out the outlet opening of the housing. In the second flow position, water flows from the inlet port, through the second flow channel and out the outlet port of the mounting member. Therefore, by rotation of the housing, water is diverted from passing through the housing to passing through the mounting member.

These and other advantages and features of novelty which characterize the invention are pointed out with particularity in the claims annexed hereto. However, for a better understanding of the invention and its advantages, reference should be made to the drawings which form a further part hereof, and to the accompanying descriptive matter in which there is illustrated and described a preferred embodiment of the invention.

DETAILED DESCRIPTION OF THE PREFERRED EMBODIMENT

Figure 1:
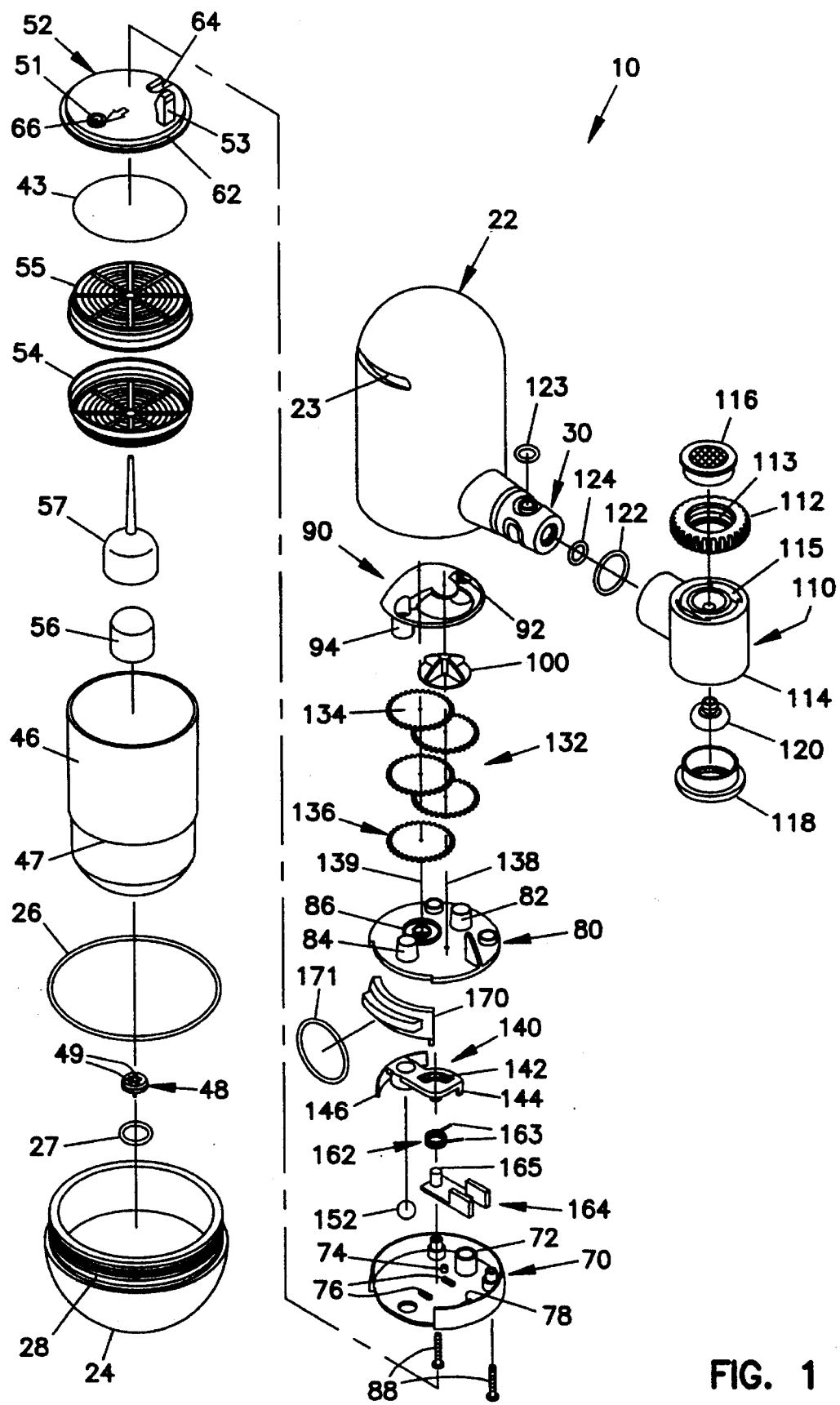
FIG. 1 is an exploded perspective view of a water treatment device according to the present invention.

Referring now to the drawings wherein like numerals designate like parts, a faucet-mounted water treatment device 10 is shown in FIGS. 1–8. Although water treatment device 10 is faucet mounted, many of the novel features disclosed herein can be incorporated into in-line or countertop devices as well.

Figure 2:
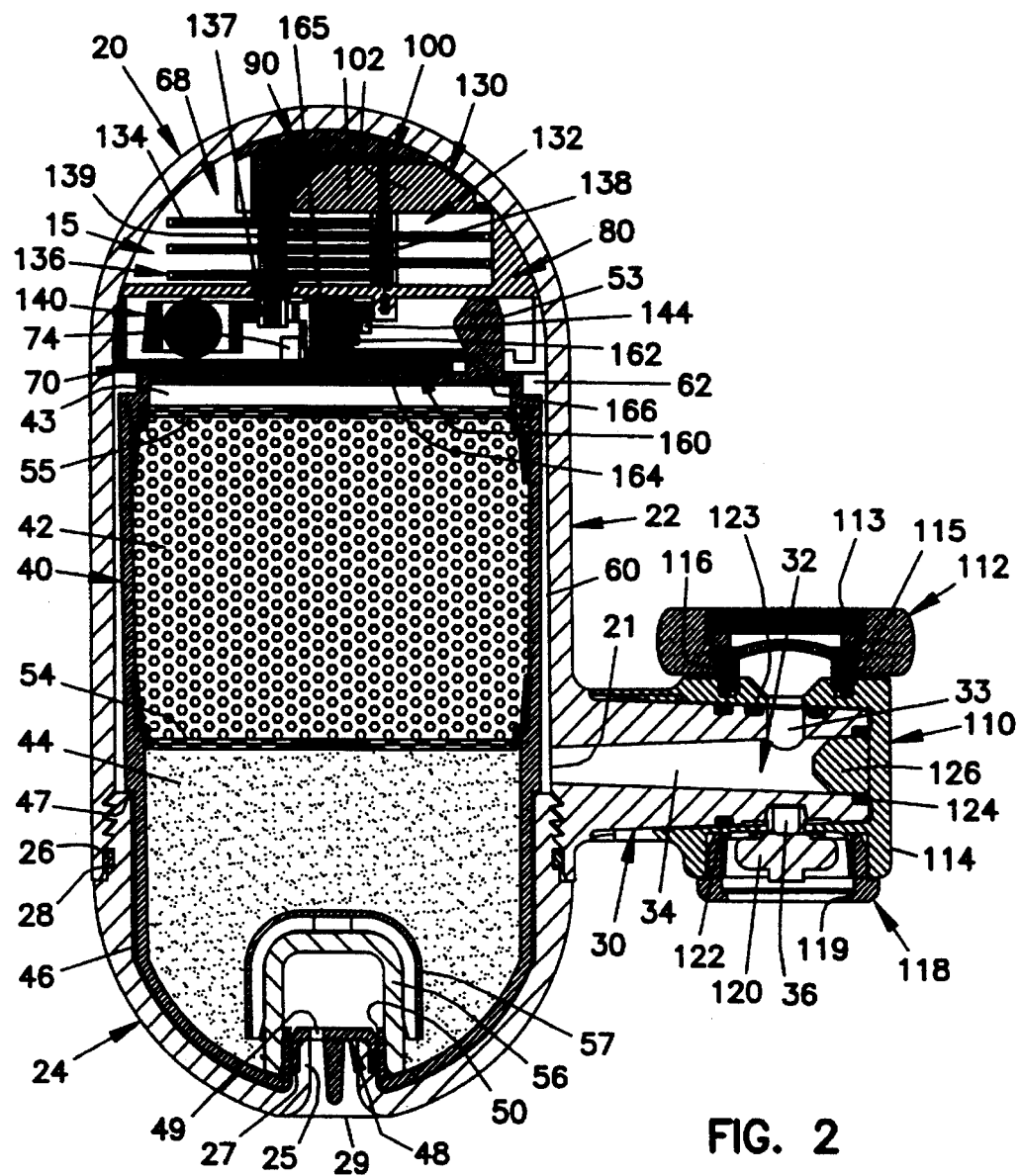
FIG. 2 is a cross-sectional view of the water treatment device shown in FIG. 1 as viewed generally from Section 2—2 of FIG. 4.

Referring to FIGS. 1 and 2, water treatment device 10 includes housing 20 which comprises upper portion 22 and cap 24 which threads into upper portion 22. First O-ring 26 is provided in channel 28 to create a watertight seal between upper portion 22 and cap 24. Replaceable filter cartridge 40 is inserted into upper portion 22 from below, and cap 24 is threaded to upper portion 22 to secure cartridge 40 in housing 20.

Figure 3:
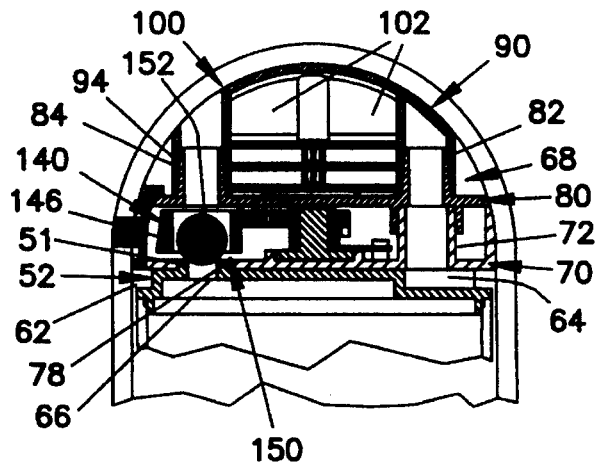
FIG. 3 is a partial cross-sectional view of the water treatment device shown in FIG. 1 as viewed from Section 3—3 of FIG. 5.

Water flows through housing 20 and cartridge 40 as follows. Water enters housing 20 from valve body 30 at inlet opening 21 and fills annular space 60 between cartridge 40 and housing 20, including peripheral annular channel 62 formed in top 52 of cartridge 40. As best shown in FIGS. 1 and 3, water then flows from channel 62, into notch 64 of top 52 and up through cylindrical portions 72, 82 of lower 70 and upper 80 plates, respectively. Water is then directed out of jet 92 of top plate 90 (best shown in FIG. 1) to turn blades 102 of turbine 100. Turbine 100 is tightly nested in top plate 90, as best shown in FIG. 2, with minimum clearance between blades 102 and top plate 90 to maximize turbine efficiency. Water exits turbine 100 and passes through exit cylinder 94 of top plate 90, which extends over second cylindrical portion 84 of upper plate 80.

In normal operation (i.e. when flow has not been "shut off"), water then flows into cartridge 40 through inlet opening 66 in top 52. While water primarily flows as described due to the arrangement of the various parts, it should be understood that water also fills chamber 68 generally defined between lower plate 70 up to upper portion 22 of housing 20. Water flows through cartridge 40 by passing through filter disc 43, second screen 55, first media 42, first screen 54, second media 44, and post filter 56, respectively, and then out through holes 49 in retainer 48. Water then exits housing 20 from outlet opening 29. It will be understood that outlet opening 29 could take on various configurations and could be from various positions in housing 20, although it is preferable that opening 29 be from bottom of housing 20.

Mounting member 110 is used to mount water treatment device 10 to a faucet (not shown). Adapter nut 112 defines inlet port 113 and is connected to body 114 by screen 116, which is shouldered by adaptor nut 112 and sealingly held in annular channel 115 of body 114. Aerator 118 and aerator nub 120 are inserted into body 114 from below, with aerator 118 defining outlet port 119. Mounting member body 114 extends over valve body 30, and they are sealed together by third 122, fourth 123 and fifth 124 O-rings. Fifth O-ring 124 surrounds extension 126 of body 114, which extends into axial channel 34 of valve body 30. Axial channel 34 is preferably tapered for ease of manufacturing by injection molding.

Valve body 30 is rotatable within mounting member 110 between two flow positions to allow the user to bypass cartridge 40 if desired. In the first flow position shown in FIG. 2, water flows from inlet port 113, through first flow channel 32 defined by radial 33 and axial 34 channels and into inlet opening 21 of housing 20. In the second flow position shown in FIGS. 7 and 8, water flows from inlet port 113, through C-shaped second channel 36 and out outlet port 119 of mounting member 110. It will be understood by those skilled in the art that first 32 and second 36 channels can be configured in a variety of other ways to achieve the result of diverting flow by rotation of housing 20. It will also be understood that it is not required that valve body 30 be molded as a single part with upper portion 22 of housing 20 as in the preferred embodiment, although it is required that valve body 30 be fixedly connected to housing 20.

Water treatment device 10 includes an arrangement 15 for indicating the useful life remaining in replaceable filter cartridge 40. Arrangement 15 includes flow totalization mechanism 130 and shutoff valve mechanism 150. It will be understood by those skilled in the art that a variety of totalization 130 and valve 150 mechanisms could be employed within the scope of the present invention to achieve the same purpose. Arrangement 15 also includes reset mechanism 160 for resetting totalization 130 and valve 150 mechanisms. In the preferred embodiment reset mechanism 160 includes biased spring 162 which is released by insertion of cartridge 40. However, it will be understood by those skilled in the art that spring 162 could be released by other means. It will also be understood that totalization 130 and valve 150 mechanisms could be reset by a variety of other mechanisms responsive to insertion of cartridge 40 which do not incorporate a spring.

In the preferred totalization mechanism 130, turbine 100 is connected with a plurality of gears 132 which in turn are connected with a rotating sector 140. It will be understood that turbine 100 need not be directly connected to first gear 134 and that sector 140 need not be directly connected to last gear 136. Gears 132 are successively interconnected, with each having a 10-to-1 ratio in the preferred embodiment. Turbine 100 and two gears 132 are stacked on first pin 138, and the remaining three gears 132, including first 134 and last 136 gears are stacked on second pin 139. Pins 138, 139 are held in place from above by upper portion 22 of housing 20. From below, first pin 138 is inserted into a hole in upper plate 80, and second pin 139 is held in place by last gear 136, which extends through and is seated on raised portion 86 of upper plate 80.

Figure 4:
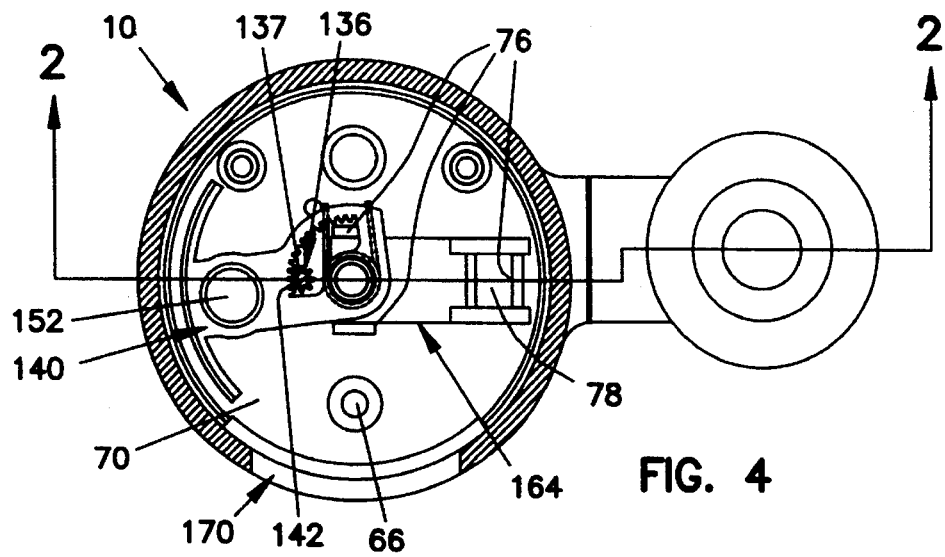
FIG. 4 is a top partial cross-sectional view of the flow shutoff mechanism of the present invention, with the mechanism in the zero volume position.
Figure 5:
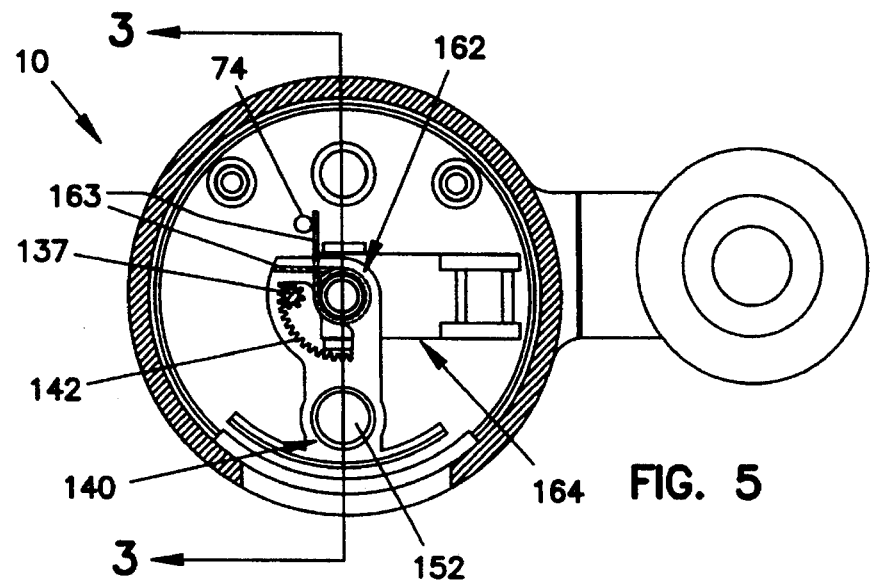
FIG. 5 is a top partial cross-sectional view of the flow shutoff mechanism of the present invention, with the flow shutoff mechanism at the end-of-life position.

Last gear 136 is connected to sector 140 by pinion 137 of last gear 136 engaging teeth 142 of sector 140, as best shown in FIGS. 4 and 5. Thus, as turbine 100 rotates, gears 132 are successively rotated, causing sector 140 to be rotated by pinion 137 and thereby "adding up" the volume of water that has passed through cartridge 40.

The preferred shutoff valve mechanism 150 includes ball 152, which is held by and rotated with sector 140, and flow inlet opening 66 of filter cartridge 40. Shutoff mechanism 150 starts in a zero volume position, as shown in FIGS. 2 and 4. After totalization mechanism 130 has rotated sector 140 to the flow stop position, as shown in FIGS. 3 and 5, ball 152 becomes seated in inlet opening 66 of cartridge 40, which is formed by raised portion 51 of top 52 extending through lower plate 70. It will be understood by those skilled in the art that a variety of other suitable mechanical valve mechanisms could also be employed.

Figure 6:
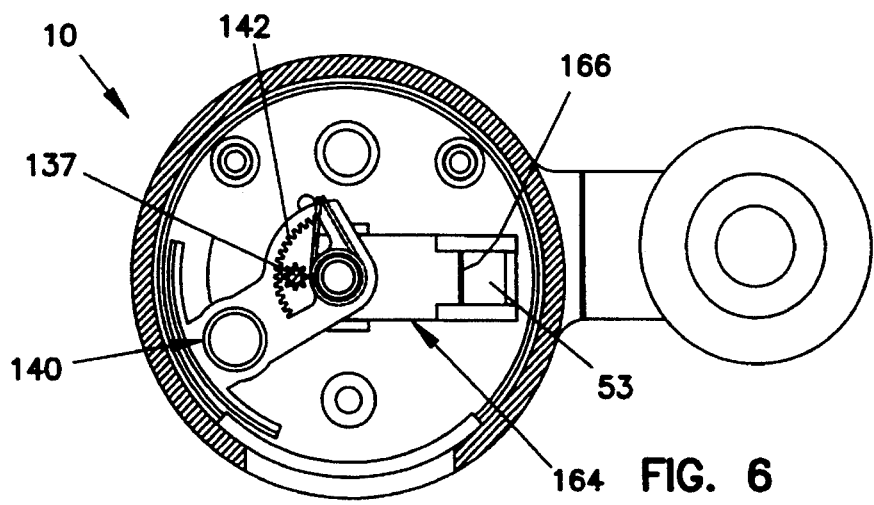
FIG. 6 is a top partial cross-sectional view of the flow shutoff mechanism of the present invention, with the flow shutoff mechanism in an intermediate position and the reset mechanism of the present invention activated.
Figure 8:
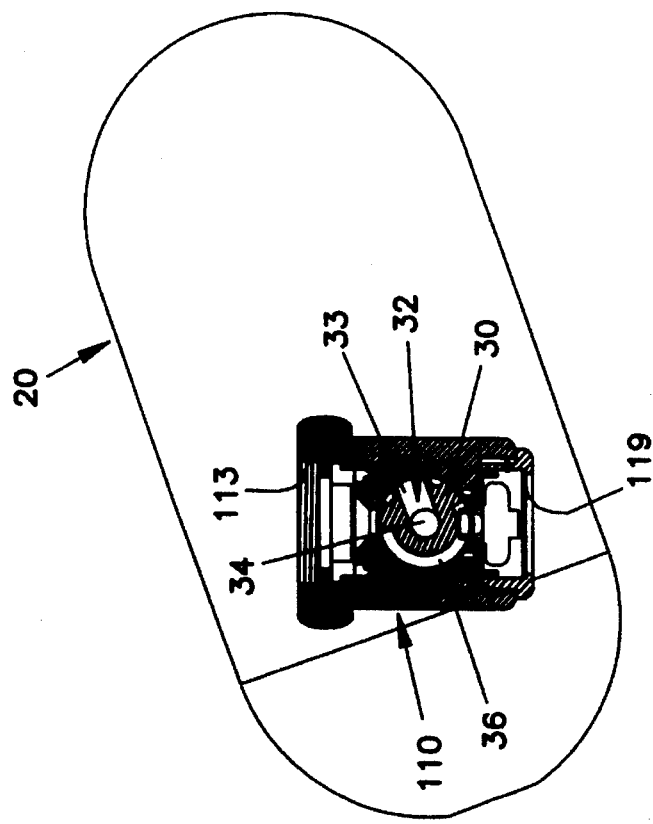
FIG. 8 is an end cross-sectional view of the flow-bypass mechanism shown in FIG. 7 as viewed from Section 8—8 of FIG. 7.
Figure 7:
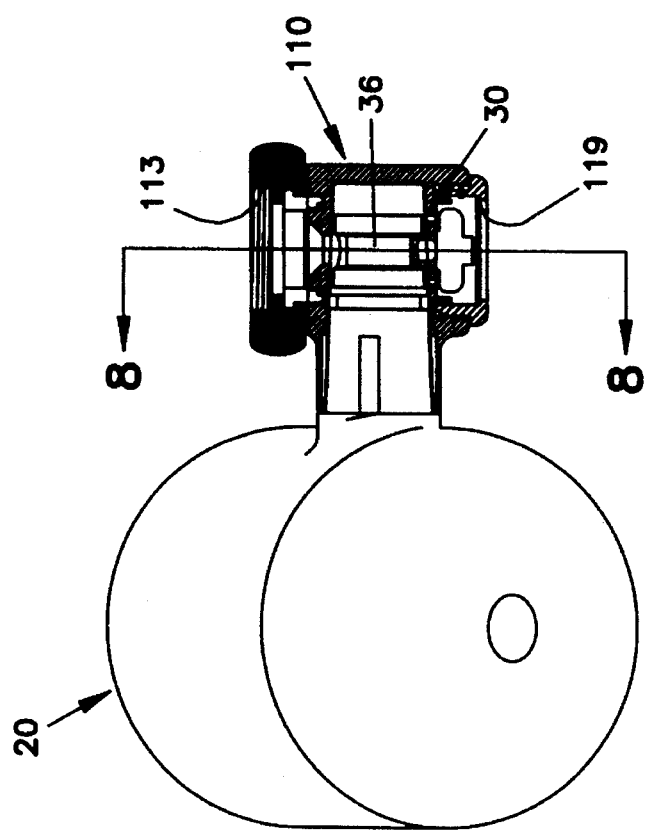
FIG. 7 is a cross-sectional view of a bypass mechanism according to the present invention, with the flow diverted through the mounting member.

Reset mechanism 160 includes spring 162 which is connected to and wound by sector 140 as sector 140 rotates. It will be understood that, while the preferred embodiment employs a wound coil spring 162, numerous other types of springs as discussed hereinabove and a variety of other arrangements and connections could be employed whereby a spring is biased by a flow totalization mechanism. To release spring 162 in the preferred embodiment, pinion 137 is radially disengaged from teeth 142 of sector 140, thereby causing sector 140 to be rotated back to the zero volume position by spring 162, as shown in FIG. 6. It will be understood that teeth 142 and pinion 137 could also be separated axially to achieve the same result.

In the preferred embodiment, spring 162 is released by a transverse movement of slide 164 acting as a release arm. Slide 164 includes vertical extension 165 onto which sector 140 and spring 162 are rotatably mounted. Spring 162 includes levers 163 extending from opposite ends, with one of levers 163 abutting stop 144 on sector 140 and the other lever 163 abutting fixed stop 74 on lower plate 70. This arrangement allows spring 162 to serve both the functions of resetting sector 140 and returning slide 164 to its unslid position because spring 162 resists torsional movement of sector 140 as well as transverse movement of slide 164. Slide 164 is held in line by guides 76 on lower plate 70. The components between upper 80 and lower 70 plates are held together by screws 88 inserted from below, as shown in FIG. 1.

In the preferred embodiment, slide 164 is slid by insertion and removal of filter cartridge 40. It will be understood that slide 164 could be moved in a variety of other ways, such as by pushing a button to reset totalization mechanism 130. It will also be understood that totalization mechanism 130 could also be reset by a variety of other mechanisms which are responsive to replacement of cartridge 40. For example, a mechanism could be constructed such that insertion of cartridge 40 causes last gear 136 to axially separate from sector 140, or that causes separation and turning of sector 140 without use of a spring 164.

In the preferred arrangement, slide 164 is slid by cam 53 extending axially from top 52 of cartridge 40. When cartridge 40 is axially inserted into housing 20, cam extends through opening 78 in lower plate 70 and abuts cam follower surface 166 on slide 164 to move slide 164 transversely.

In addition to providing a flow stop indication of end of life, a continuous visual indication of the amount of useful life remaining in replaceable filter cartridge 40 is provided in the preferred embodiment. This is accomplished by colored screen 146 at the end of sector 140, which is visible through lens 170 as sector 140 rotates. Referring to FIG. 1, lens 170 is inserted into slot 23 of upper portion 22 of housing 20, and is sealed by gasket 171.

In the preferred embodiment, cartridge 40 comprises two chemical filter media, including first media 42, which comprises an ion exchange resin suitable for removing lead, and second media 44, which comprises Granular Activated Charcoal ("GAC"). Mechanical or other chemical filter media can also be employed within the scope of the invention in various numbers or combinations.

In the preferred cartridge 40, media 42, 44 are enclosed by base 46, O-ring retainer 48 which is friction fit with an inwardly extending cylindrical portion 50 of base 46, and top 52 which is friction fit with an inner side of the upper portion of base 46. Base 46 includes shoulder 47 which is supported by cap 24 to push cartridge 40 upwardly into housing 20. Retainer 48 holds second O-ring 27 in place to create a seal between retainer 48, cylindrical portion 50 and inward extension 25 of cap 24. Water exits cartridge 40 through holes 49 in retainer 48.

Within cartridge 40, filter media 42, 44 (not shown in FIG. 1) are separated by first screen 54, and second screen 55 separates first media 42 from filter disc 43 which is held between top 52 and second screen 55. Filter disc 43 is made of white filter paper and is for the purpose of providing the user with a visual reference to assure the user that cartridge 40 is performing its function and to indicate whether a particular cartridge has been used. In the preferred embodiment, top 52 is clear so that the user can see if disc 43 has gathered contaminants, indicating that the cartridge 40 has been used. U-shaped post filter 56 extends over cylindrical portion 50 to prevent GAC from being flushed out, and post filter cap 57 extends over filter 56 to direct the flow of water to bottom of cartridge 46 to assure that the entire second media 44 is utilized.

It should be understood that the present invention is not limited to the preferred embodiment discussed above, which is illustrative only. Changes may be made in detail, especially matters of shape, size, arrangement of parts, or material of components within the principles of the invention to the full extent indicated by the broad general meanings of the terms in which the appended claims are expressed.

What is claimed is:

1. An arrangement in a water treatment device, comprising:

(a) a replaceable filter cartridge;

(b) flow totalization means for mechanically totalling a volume of water that has been filtered through said replaceable filter cartridge;

(c) means for indicating end of life of said replaceable filter cartridge, including shutoff valve means for stopping flow of water through said filter cartridge after a predetermined volume of water has been totaled by said flow totalization means; and (d) means for resetting said flow totalization means to a zero volume position, including:

(i) a spring connected with and biased by said flow totalization means; and (ii) means for releasing said spring to reset said flow totalization means.

2. An arrangement according to claim 1, wherein said end-of-life indicating means further includes visual means for indicating end-of-life.

3. An arrangement according to claim 1, wherein said flow totalization means includes:

(a) a turbine powered by water flowing through said water treatment device;

(b) a gearing mechanism connected with said turbine such that rotation of said turbine rotates a plurality of successively interconnected gears including a first gear connected with said turbine and a last gear; and (c) a rotating sector connected with said last gear, said sector being connected with said spring and biasing said spring as said sector is rotated by said last gear.

4. An arrangement according to claim 3, wherein said spring release means includes means for releasing said sector from connection with said last gear.

5. An arrangement according to claim 4, wherein said spring release means further includes a slide onto which said rotating sector is pivotally attached, said slide being slidable so as to release said sector from connection with said last gear thereby releasing said spring, whereby said sector is returned by said spring to said zero volume position to reset said flow totalization means.

6. An arrangement according to claim 5, wherein said slide includes a cam follower surface and said slide is slid by a cam abutting said follower surface to reset said flow totalization means.

7. An arrangement according to claim 6, wherein said cam extends from an end of said replaceable filter cartridge such that, when said cartridge is inserted into said water treatment device, said flow totalization means is reset.

8. An arrangement according to claim 5, wherein said spring is a wound coil having levers extending from opposite ends, with one of said levers abutting a first stop on said sector and the other abutting a fixed second stop, such that said spring forces said slide to return to an unslid position.

9. An arrangement according to claim 8, wherein said spring and said sector are both pivotally mounted onto an extension of said slide.

10. An arrangement according to claim 3, wherein said last gear includes a pinion and said sector is directly connected to said last gear through a plurality of teeth constructed and arranged to engage said pinion, whereby said pinion rotates said sector to provide flow totalization and said pinion is disengageable from said teeth to release said spring and reset said flow totalization means.

11. An arrangement according to claim 3, wherein said shutoff valve means includes:

(a) a ball held by and rotated with said sector; and (b) a flow inlet opening of said replaceable filter cartridge constructed and arranged for receiving said ball so as to stop flow through said inlet opening.

12. An arrangement in a device for treating water, comprising a replaceable filter cartridge and a shutoff valve which closes to stop flow after a predetermined volume of water has passed through said replaceable filter cartridge, said arrangement further including a spring and a release arm, said spring being loaded when said shutoff valve closes, and said release arm unloading said spring to force said shutoff valve open upon replacement of said filter cartridge.

13. An arrangement in a water treatment device, comprising:
    (a) a replaceable filter cartridge;
    (b) flow totalization means for mechanically totaling a volume of water that has been filtered through said replaceable filter cartridge;
    (c) means for indicating end of life of said replaceable filter cartridge, including shutoff valve means for stopping flow of water through said filter cartridge after a predetermined volume of water has been totaled by said flow totalization means, said shutoff valve means including a valve which is permanently contained within said water treatment device such that said valve is not replaced upon replacement of said filter cartridge; and
    (d) mechanical means for resetting said flow totalization means to a zero volume position, including filter cartridge replacement means for resetting said flow totalization means upon replacement of said filter cartridge.

14. An arrangement according to claim 13, wherein said reset means includes a spring interconnected with and biased by said flow totalization means such that, when said cartridge is inserted into said water treatment device, said spring is released to reset said flow totalization means.

15. An arrangement according to claim 14, wherein said filter cartridge replacement means includes a cam extending from said replaceable filter cartridge such that said spring is released by said cam to reset said flow totalization means upon insertion of said cartridge.

16. A faucet-mounted water treatment device having a replaceable filter cartridge comprising faucet mounting means for mounting the water treatment device on a faucet and end-of-life indicating means for indicating when said replaceable filter cartridge has reached the end of its useful life, said end-of-life indicating means including shutoff valve means for stopping flow of water through said filter cartridge after a predetermined volume of water has been filtered through said water treatment device.

17. A faucet-mounted water treatment device according to claim 16, wherein said end-of-life indicating means further includes visual means for indicating end-of-life, said water treatment device further including flow totalization means for mechanically totaling the volume of water that has been filtered through said water treatment device, said visual means cooperating with said mechanical flow totalization means to provide a continuous visual indication of the amount of useful life remaining in said replaceable filter cartridge.

18. A water treatment device for mounting to a faucet, comprising:
    (a) a housing with a filter element contained therein and having inlet and outlet openings, wherein said outlet opening opens from said housing such that treated water flows out of the water treatment device from said housing;
    (b) a mounting member having inlet and outlet ports, said inlet port being attachable to said faucet;
    (c) a valve in operable connection with said mounting member and said housing and having first and second flow channels, said first flow channel selectably providing flow between said inlet port and said inlet opening, said second flow channel selectably providing flow between said inlet and outlet ports;
    (d) said housing being rotatable with respect to said mounting member between first and second flow positions such that:
        (i) in said first flow position, water flows from said inlet port, through said first flow channel, into said inlet opening of said housing, through said filter element and out said outlet opening of said housing; and
        (ii) in said second flow position, water flows from said inlet port, through said second flow channel and out said outlet port of said mounting member;
    (e) whereby rotation of said housing diverts water flow from passing through said filter element and out said outlet opening of said housing to passing through said mounting member and out said outlet port of said mounting member.

19. An arrangement in a water treatment device, comprising:
    (a) a replaceable filter cartridge;
    (b) a flow totalizer which mechanically totals a volume of water that has been filtered through said replaceable filter cartridge;
    (c) an end-of-life indicator including a shutoff valve which stops flow of water through said filter cartridge after a predetermined volume of water has been totaled by said flow totalizer; and
    (d) a reset mechanism for resetting said flow totalizer to a zero volume position, including:
        (i) a spring connected with and biased by said flow totalizer; and
        (ii) a release mechanism which releases said spring to reset said flow totalizer.

20. An arrangement according to claim 19, further including a visual indicator cooperating with said flow totalizer to provide a continuous visual indication of the amount of useful life remaining in said replaceable filter cartridge.

21. An arrangement according to claim 19, wherein said spring release mechanism is activated by replacement of said filter cartridge.

22. An arrangement according to claim 21, wherein a protrusion extending from said replaceable filter cartridge is constructed and arranged to release said spring upon replacement of said filter cartridge.

23. An arrangement according to claim 19, wherein said spring is a wound coil.

24. An arrangement in a water treatment device, comprising:
    (a) a replaceable filter cartridge;
    (b) a flow totalizer which mechanically totals a volume of water that has been filtered through said replaceable filter cartridge;
    (c) an end-of-life indicator including a shutoff valve which stops flow of water through said filter cartridge after a predetermined volume of water has been totaled by said flow totalizer; and
    (d) a mechanical reset mechanism constructed and arranged for returning said flow totalizer to a zero volume position upon replacement of said filter cartridge.

25. An arrangement according to claim 24, wherein said reset mechanism includes a spring connected with and biased by said flow totalizer such that replacement of said cartridge causes said spring to be released to reset said flow totalizer.

26. An arrangement according to claim 24, wherein said filter cartridge includes a protrusion extending therefrom constructed and arranged to reset said flow totalizer upon replacement of said cartridge.

27. A faucet-mounted water treatment device, comprising:

(a) a faucet mounting member;

(b) a housing extending therefrom and having a replaceable filter cartridge contained therein;

(c) a flow totalizer which totals a volume of water that has been filtered through said filter cartridge; and (d) an end-of-life indicator for indicating when said filter cartridge has reached the end of its useful life, including a valve for stopping flow of water through said filter cartridge after a predetermined volume of water has been totaled by said flow totalizer.

28. A faucet-mounted water treatment device according to claim 27, wherein said flow totalizer is a mechanical totalizer.

29. A faucet-mounted water treatment device according to claim 28, wherein said mechanical totalizer includes a turbine and a plurality of interconnected gears.

30. A faucet-mounted water treatment device according to claim 27, further including a visual indicator cooperating with said flow totalizer to provide a visual indication of the amount of useful life remaining in said replaceable filter cartridge.

31. A water treatment device for mounting to a faucet, comprising:

(a) a housing with a filter element contained therein and having inlet and outlet openings, wherein said outlet opening opens from said housing such that treated water flows out of the water treatment device from said housing;

(b) a mounting member having inlet and outlet ports, said inlet port being attachable to said faucet;

(c) a valve in operable connection with said mounting member and said housing, constructed and arranged to selectively provide flow between said inlet port and said inlet opening and between said inlet and outlet ports;

(d) said housing being rotatable with respect to said mounting member between first and second flow positions such that:

(i) in said first flow position, water flows from said inlet port, through said valve, into said inlet opening of said housing, through said filter element and out said outlet opening of said housing; and (ii) in said second flow position, water flows from said inlet port, through said valve and out said outlet port of said mounting member;

(e) whereby rotation of said housing diverts water flow from passing through said filter element and out said outlet opening of said housing to passing through said mounting member and out said outlet port of said mounting member.

32. A water treatment device according to claim 31, wherein said valve includes a first flow channel selectably providing flow between said inlet port and said inlet opening and a second flow channel selectably providing flow between said inlet and outlet ports.

33. A water treatment device according to claim 32, wherein said second flow channel is generally C-shaped and at least partially surrounds said first flow channel.

34. A water treatment device according to claim 31, wherein said valve comprises a valve body which extends from said housing and rotates within said mounting member.

* * * * *

UNITED STATES PATENT AND TRADEMARK OFFICE
CERTIFICATE OF CORRECTION

PATENT NO.   :   5,527,451

DATED        :   June 18, 1996

INVENTOR(S)  :   Richard D. Hembree, Brian F. Sullivan

It is certified that error appears in the above-identified patent and that said Letters Patent is hereby corrected as shown below:

Title Page, [54] Title; delete "WATER TREATMENT DEVICE WITH VOLUME TOTALIZATION VALVE" and insert --WATER TREATMENT DEVICE WITH TOTALIZER AND BYPASS--.

Column 1, lines 1 and 2; delete "WATER TREATMENT DEVICE WITH VOLUME TOTALIZATION VALVE" and insert --WATER TREATMENT DEVICE WITH TOTALIZER AND BYPASS--.

Signed and Sealed this

Third Day of December, 1996

Attest:

BRUCE LEHMAN

Attesting Officer     Commissioner of Patents and Trademarks